United States Patent [19]

Schoenmakers

[11] Patent Number: 4,497,008

[45] Date of Patent: Jan. 29, 1985

[54] MAGNETIC-TAPE CASSETTE WITH PIVOTAL, NESTING COVER

[75] Inventor: Johannes J. M. Schoenmakers, Eindhoven, Netherlands

[73] Assignee: U.S. Philips Corporation, New York, N.Y.

[21] Appl. No.: 387,918

[22] Filed: Jun. 14, 1982

[30] Foreign Application Priority Data

Jun. 16, 1981 [NL] Netherlands .................... 8102877

[51] Int. Cl.³ .................... G11B 23/02; G11B 15/32; G03B 1/04
[52] U.S. Cl. .................... 360/132; 242/198
[58] Field of Search .................... 360/132, 93, 96.5, 60; 242/197, 198, 199, 200, 201, 202, 192, 55.19 A

[56] References Cited

U.S. PATENT DOCUMENTS

| | | | |
|---|---|---|---|
| 3,861,619 | 1/1975 | Wolff | 242/188 |
| 3,904,150 | 9/1975 | Pinot | 242/199 |
| 3,932,891 | 1/1976 | Horvath | 360/132 |
| 3,950,786 | 4/1976 | Shapley | 360/132 |
| 4,022,395 | 5/1977 | Kishi | 242/198 |
| 4,093,149 | 6/1978 | Shroff | 360/132 |
| 4,130,848 | 12/1978 | Amano | 360/93 |
| 4,235,395 | 11/1980 | Wardenaar | 242/199 |

Primary Examiner—Robert M. Kilgore
Attorney, Agent, or Firm—David R. Treacy

[57] ABSTRACT

A magnetic-tape cassette comprises a housing containing a magnetic tape, part of which extends across an opening in the front side of the housing which opening can be covered by a front cover of channel section which is pivotable on the housing at or near a corner thereof. In addition to being pivotable the front cover is also slidable on the housing when in the open position into a retracted position in which it extends along a side wall of the housing. In the retracted position the flanges of the channel-section front cover are received in, and substantially completely fill, recesses which are formed in the outer surfaces of the major walls of the cassette housing adjacent said side wall thereof.

9 Claims, 4 Drawing Figures

MAGNETIC-TAPE CASSETTE WITH PIVOTAL, NESTING COVER

BACKGROUND OF THE INVENTION

The invention relates to a magnetic-tape cassette having a pivotal cover for the opening through which tape is pulled out or scanned; and particularly to such a cassette comprising a housing having first and second major walls, lying substantially in parallel planes, two side walls, a rear wall and a front side with a front opening between the major walls; two rotatable reels arranged adjacent each other between the major walls; a magnetic-tape which is attached to the reels and part which extends across said front opening of the housing for cooperation with parts of a magnetic-tape apparatus; and at least one front cover of channel section which is pivotable between an open position and a closed position about an axis which is disposed perpendicularly to the major walls at or near a front corner of the housing, which front cover is constructed to cover at least partly the front opening of the housing in the closed position and is connected to the housing in such a way as to be slidable relative to the housing between an extended position and a retracted position in which the front cover extends along one of the side walls of the housing.

Such a magnetic-tape cassette is known from U.S. Pat. No. 3,904,150. This known magnetic-tape cassette comprises a front cover which is movable between a closed position, in which it covers the front of the cassette housing, and a fully retracted position, in which the cover is positioned against the near wall of the housing. In a partly retracted position the cover is disposed adjacent a side wall of the housing. The shape of the housing and the front cover is such that the cover, when it is in the last-mentioned position, is situated almost completely beside the side wall of the housing, so that in this position the overall width of the cassette is substantial. If in this position the magnetic-tape cassette is slid over a frame plate of a magnetic-tape apparatus towards the magnetic heads of the apparatus in the customary manner, the front cover consequently projects from the side of the cassette for some distance. This means that the magnetic-tape apparatus must have sufficient room to accommodate the front cover, with the result that the magnetic-tape apparatus becomes unnecessarily large.

From U.S. Pat. No. 3,861,619 it is known to provide at least a part of the front cover with portions situated in the planes of the major walls. The cover of this invention is automatically pivoted to a position extending in front of the cassette, upon insertion into a cassette compartment.

SUMMARY OF THE INVENTION

It is an object of the invention to provide a magnetic-tape cassette of the type mentioned in the opening paragraph which can be inserted into a magnetic-tape apparatus with a sliding movement and whose front cover when open requires minimal space in the magnetic-tape apparatus.

To this end the invention is characterized in that the flanges of the channel-section front cover lie substantially in the planes of the major walls of the cassette housing both in the closed position and in the retracted position of the front cover, and in that recesses are formed in the outer surfaces of said major walls adjacent said one of the side walls of the housing to receive the flanges of the front cover in the retracted position.

Thus, when its front cover is in the retracted position, the cassette according to the invention has overall dimensions, both in a direction perpendicular to the major walls of the housing and in the lateral direction of the cassette, which do not differ significantly from the overall dimensions in the closed position of the front cover. This makes the cassette very suitable for use in compact equipment.

In this way it is also possible to obtain a magnetic-tape cassette in which the front cover two does not project from the front of the cassette housing in the retracted position.

For mounting the front cover on the housing of the magnetic-tape cassette the invention utilizes the flanges of the cover, which are eminently suitable for arranging the front cover in such a way that it is both pivotable and slidable.

An embodiment of the invention is characterized in that each of the flanges of the front cover is formed with a slot, projections extend perpendicularly from the outer surfaces of the major walls of the cassette housing at or near their front corners, and the flanges cooperate pivotally and slidably with the cassette housing by means of these projections, which pivotally and slidably engage in the slots in the flanges. This embodiment has the advantage that the front cover itself can be of simple shape, owing to the fact that it has no projecting pivot portions. These portions are formed on the housing of the magnetic-tape cassette, which housing is generally manufactured by means of an injection-molding process, which process is eminently suitable for the formation of the desired projecting pivot portions. The front cover may, for example, be manufactured from a metal sheet by means of simple stamping and bending operations, the desired slots being formed during stamping.

In order to minimize the risk of damage to or contamination of the magnetic tape when handling the magnetic-tape cassette outside a magnetic-tape apparatus, an embodiment of the invention is of interest which comprises latching means for latching the front cover in the closed position, and which is characterized in that the latching means comprise relieved surfaces or steps which are formed in the outer surfaces of the major walls of the cassette housing along the front edges thereof to receive portions of the flanges of the front cover when the cover is in the closed position, the arrangement being such that the front edges of the major walls are thereby gripped between the flanges of the cover.

An embodiment of the invention in which the front cover can be opened easily by a magnetic-tape apparatus is characterized in that the front cover comprises uneven portions which are cooperable with opening means on a magnetic-tape apparatus for swinging open the front cover and moving it to the retracted position.

Embodiments of the invention will be described in more detail with reference to the drawings.

DESCRIPTION OF THE PREFERRED EMBODIMENTS

Figure 1:
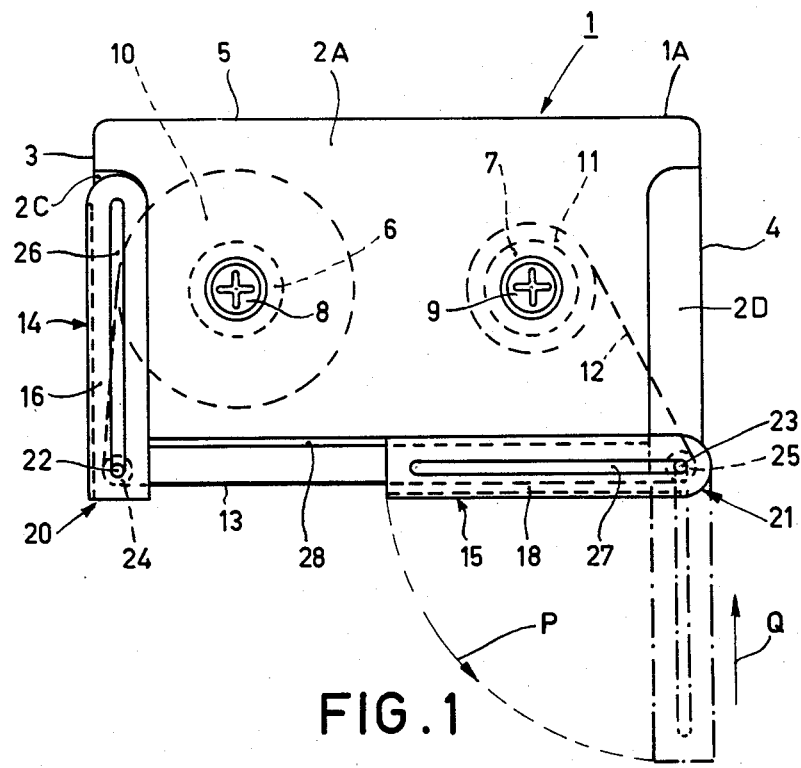
FIG. 1 is a plan view of a magnetic-tape cassette in accordance with the invention, which cassette comprises two front covers, one front cover being in the open, retracted position and the other front cover being closed.
Figure 2:
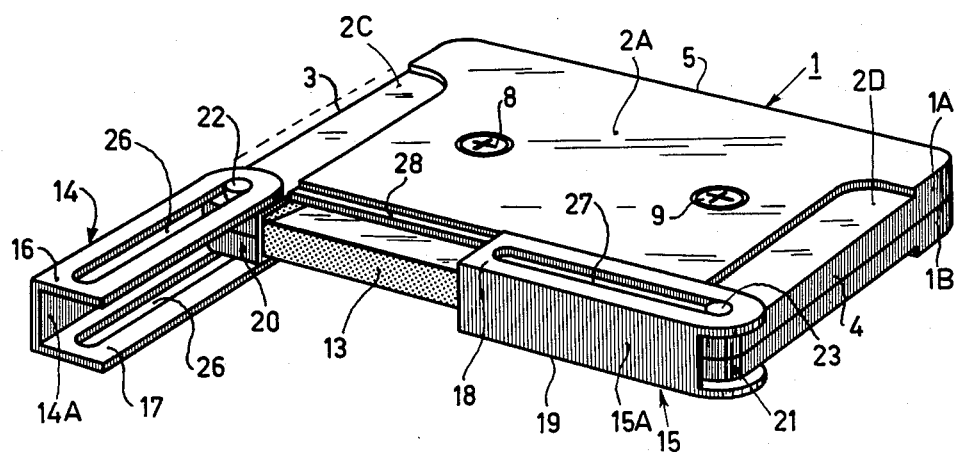
FIG. 2 is a perspective view of the magnetic-tape cassette of FIG. 1, one front cover being in its open but extended position and the other front cover being in the closed position.

The housing 1 of the magnetic-tape cassette shown in FIGS. 1 and 2 is rectangular and comprises two substantially identical housing sections 1A and 1B which are manufactured from a plastic by means of a suitable process. The housing sections 1A and 1B comprise two similar major walls 2A and 2B respectively which lie substantially in parallel planes.

The two major walls are interconnected by side walls 3 and 4 and a rear wall 5. Opposite the rear wall 5 the housing 1 has an open front side. Rotatable winding reels 6 and 7 with reel hubs 8 and 9 through which the reels can be driven by a magnetic tape apparatus, are arranged adjacent one another between the major walls. As shown at 10 and 11, a magnetic tape 12 is wound on the reels. A part 13 of the magnetic tape 12 extends across the opening at the front of the housing 1 and can thus cooperate with parts of a magnetic-tape apparatus, such as magnetic heads, capstans and pressure rollers and means which can be positioned behind the part 13 of magnetic tape in order to withdraw it slightly from the housing. At the front of the cassette housing two front covers 14 and 15 are arranged, which covers are pivotable about axes which are disposed perpendicularly to the major walls 2A and 2B of the cassette housing or near the two front corners thereof. In the closed position (see front cover 15 in FIG. 1 or in FIG. 2) each front cover covers one half of the front opening of the cassette housing. Each front cover, as is indicated by the curved arrow P for the cover 15, can be pivoted from the closed position into an open position, represented by dash-dot lines for the cover 15.

In the open position, each front cover, as is indicated by the arrow Q, for the cover 15, is also slidable along the adjacent side wall 3 or 4 of the cassette housing. In the position represented by the dash-dot lines in FIG. 1 the front cover 15 is in an extended open position, from which it can be slid along the side wall 4 into a retracted open position, not shown. The front cover 14 is shown in its retracted position. In the retracted position the front covers extend along the side walls of the cassette housing, so that the total space occupied by the cassette on a magnetic-tape apparatus when the front covers are in this retracted open position is substantially no different from the total space occupied by the cassette when the front covers are in the closed position.

The front cover 14 is of channel section with flanges which lie substantially in the planes of the major walls 2A and 2B and form shielding portions 16 and 17 for shielding the edges of the part 13 of the magnetic tape 12 which extends across the front opening of the cassette housing. The front cover 15 also is of channel section with flanges which form shielding portions 18 and 19 in an identical manner. Shallow recesses 2C and 2D are formed in the outer surfaces of the major walls 2A and 2B respectively adjacent the side walls 3 and 4 to receive the flanges of the front covers 14 and 15 when the covers are in the retracted position. In this position the flanges substantially completely fill the recesses 2C and 2D, with the web portions 14A and 15A of the covers which extend between the flanges lying against the side walls 3 and 4 respectively. The two pairs of shielding portions 16, 17 and 18, 19 cooperate pivotally and slidably with the housing 1 at or near the front corners 20 and 21 respectively of the housing. At or near each corner 20 and 21, two projections which are integral one with each of the major walls 2A and 2B of the housing 1 form a pair of coaxial pivot pins 22 and respectively 23. Guide rollers 24 and 25 for guiding the magnetic tape 12 are arranged between the major walls 2A and 2B at or near the corners 20 and 21. Alternatively, the pins 22 and 23 may be integral with the guide rollers 24 and 25, which then project from the housing 1 through openings in the major walls 2A and 2B. The front covers 14 and 15 are adapted to cooperate pivotally with the pivot pins 22 and 23. The front covers are also adapted to cooperate slidably with the pivot pins. For this purpose the covers are formed with longitudinal slots 26 and 27 in their flanges. The embodiment shown has the advantage that owing to the fixed arrangement of the pivot pins the pivotal opening movement of the front covers is better defined and the front covers have a simple shape. They may for example be stamped and bent from a sheet of a suitable metal.

Figure 3:
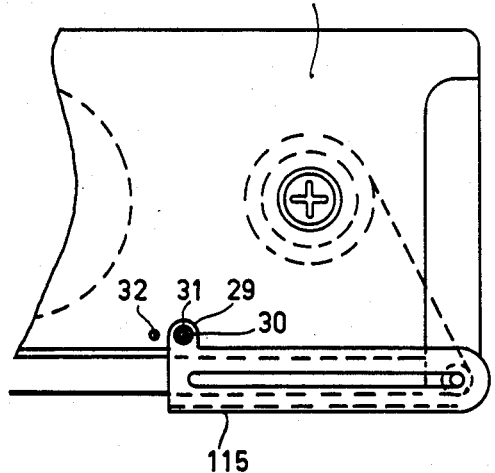
FIG. 3 is a plan view of a part of a modified magnetic-tape cassette similar to that of FIGS. 1 and 2.

For latching the front covers in the closed position there are provided latching means. These means comprise shallow steps or relieved areas 28 which are formed in the outer surfaces of the major walls 2A and 2B of the cassette housing along the front edges thereof to receive edge portions of the flanges of the front covers when the covers are in the closed position, the arrangement being such that the front edges of the major walls are thereby gripped moderately tightly between the flanges of the covers. In this way the front covers are latched in the closed position by means of frictional forces. It is alternatively possible to employ latching means which comprise inter engaging portions. FIG. 3 shows an example of these in detail. Each flange of a channel-section front cover 115 has a projecting portion 29 with an opening 30. On the major walls 102A and 102B of the cassette housing projections 31 are provided having a diameter which is slightly smaller than that of the openings 30. Further projections 32 are adapted to cooperate with openings in the flanges of a second front cover.

Figure 4:
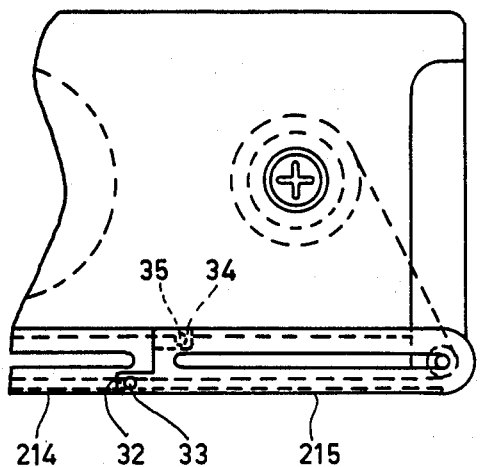
FIG. 4 is a plan view of a part of another modified magnetic-tape cassette.

FIG. 4 shows that it is alternatively possible to arrange the latching means on the front covers only. Two front covers 214 and 215 are shown in detail in the closed position in FIG. 4. The front cover 215 has a projecting portion 32 which cooperates with an extruded projection 33 on the front cover 214. In a similar way the front cover 214 has a projecting portion 34 which cooperates with an extruded projection 35 on the front cover 215.

Although one specific embodiment of the embodiment has been described in detail many further embodiments are possible within the scope of the invention. Instead of two front covers it is possible to employ only one front cover. In the embodiment shown, for pivoting the front covers from the closed to the open position and for sliding the front covers back from the extended to the retracted position, means can be provided on a magnetic-tape apparatus which will cooperate frictionally with uneven portions of the front covers, for example, on peripheral edge portions of the flanges of the covers which are situated concentrically around the pivot pins 22 and 23 and the adjoining surface of the web portions 14A and 15A of the covers. However, it is alternatively possible to provide the front covers with different uneven portions such as projecting portions or local serrations for cooperation with suitable opening means provided on a magnetic-tape apparatus. For latching the front covers it is possible to employ resilient means which are situated near the front corners of the cassette housing and, when the front covers are in the closed position, urge the front covers towards the closed position. Each front cover may, for example, be provided with a resilient lug in the part of the front cover which extends between the two shielding portions, the lug being situated near the respective front corner of the cassette, housing and cooperating with a cam-shaped projection on the cassette housing.

What is claimed is:

1. A magnetic-tape cassette comprising:
   a housing having first and second major walls lying substantially in parallel planes, two side walls, a rear wall and a front side with a front opening between the major walls,
   two rotatable reels arranged adjacent each other between the major walls,
   a magnetic tape which is attached to the reels, a part of which tape extends across said front opening of the housing for cooperation with parts of a magnetic-tape apparatus, and
   at least one front cover formed as a channel section having flanges substantially parallel to said major walls; said cover being constructed to cover, at least partly, the front opening of the housing when in a closed position, and connected to the housing in such a way as to be pivotable between an open position and the closed position about an axis which is disposed perpendicularly to the major walls at or near a front corner of the housing, and slidable relative to the housing between an extended position and a retracted position in which the front cover extends along one of the side walls of the housing,
   characterized in that
   the flanges of the channel section front cover lie substantially in the planes of the major walls of the cassette housing both in the closed position and in the retracted position of the front cover,
   said at least one cover slides in a direction parallel to the adjacent side wall when moving between the extended and retracted positions, and
   the outer surfaces of said major walls adjacent said one of the side walls of the housing have recesses formed therein to receive the respective flanges when the front cover is in the retracted position.

2. A cassette as claimed in claim 1, characterized in that the outer surfaces of the major walls of the cassette housing comprise respective projections extending perpendicularly from each major wall at or near said front corner, and each of the flanges of the front cover is formed with a slot which, in the closed position, extends parallel to the front side, each said slot pivotably and slidably engaging a respective projection.

3. A cassette as claimed in claim 2, comprising latching means for latching the front cover in the closed position, characterized in that the latching means comprises a shallow step formed in the outer surface of each of the major walls of the cassette housing along the front edges thereof to receive portions of the flanges of the front cover when the corner is in the closed position, said steps being spaced such that the front edges of the major walls are thereby gripped between the flanges of the cover.

4. A cassette as claimed in claim 1, 2 or 3, characterized in that the front cover comprises uneven portions adapted to be engaged by opening means on a magnetic-tape apparatus for swinging open the front cover and moving it to the retracted position.

5. A casssette as claimed in claim 4, characterized by comprising two said front covers, each of which is pivotable between open and closed positions about an axis disposed at or near a respective front corner of the cassette housing, each of said front covers in the closed position covering substantially half the front side of the housing.

6. A cassette as claimed in claim 1, comprising latching means for latching the front cover in the closed position, characterized in that the latching means comprises a shallow step formed in the outer surface of each of the major walls of the cassette housing along the front edges thereof to receive portions of the flanges of the front cover when the corner is in the closed position, said steps being spaced such that the front edges of the major walls are thereby gripped between the flanges of the cover.

7. A cassette as claimed in claims 1, 2, 3 or 6, characterized by comprising two said front covers, each of which is pivotable between open and closed positions about an axis disposed at or near a respective front corner of the cassette housing, each of said front covers in the closed position covering substantially half the front side of the housing.

8. A cassette as claimed in claim 1 or claim 2, characterized by comprising
   two said front covers, each of which is pivotable between open and closed positions about an axis disposed at or near a respective front corner of the cassette housing, and each of which in the closed position covers substantially half the front side of the housing and
   latching means for latching the front covers in their closed positions, said latching means comprising a part formed on one cover and a part formed on the other cover, said parts being arranged to cooperate with each other in the closed position of the covers to latch the covers in this position.

9. A cassette as claimed in claim 8, characterized in that the front cover comprises uneven portions adapted to be engaged by opening means on a magnetic-tape apparatus for swinging open the front cover and moving it to the retracted position.

* * * * *